US009748643B2

(12) United States Patent
Miller et al.

(10) Patent No.: US 9,748,643 B2
(45) Date of Patent: Aug. 29, 2017

(54) IDENTIFICATION OR MESSAGING SYSTEMS AND RELATED METHODS

(71) Applicant: The United States of America as represented by the Secretary of the Navy, Washington, DC (US)

(72) Inventors: Gerry Miller, Bedford, IN (US); James Stewart, Bloomington, IN (US)

(73) Assignee: The United States of America as represented by the Secretary of the Navy, Washington, DC (US)

(*) Notice: Subject to any disclaimer, the term of this patent is extended or adjusted under 35 U.S.C. 154(b) by 162 days.

(21) Appl. No.: 14/730,795

(22) Filed: Jun. 4, 2015

(65) Prior Publication Data

US 2016/0341823 A1 Nov. 24, 2016

Related U.S. Application Data

(60) Provisional application No. 62/162,889, filed on May 18, 2015.

(51) Int. Cl.
| | |
|---|---|
| *H01Q 15/18* | (2006.01) |
| *H01Q 3/02* | (2006.01) |
| *H01Q 15/14* | (2006.01) |
| *G01S 13/75* | (2006.01) |
| *G01S 17/74* | (2006.01) |

(52) U.S. Cl.
CPC ............ *H01Q 3/02* (2013.01); *G01S 13/751* (2013.01); *H01Q 15/14* (2013.01); *G01S 17/74* (2013.01)

(58) Field of Classification Search
CPC ......... H01Q 3/02; H01Q 15/14; G01S 13/751

USPC .......................................... 342/5–12, 42, 51
See application file for complete search history.

(56) References Cited

U.S. PATENT DOCUMENTS

| | | | | | |
|---|---|---|---|---|---|
| 4,031,535 | A | * | 6/1977 | Isbister | .................... G01S 7/04 342/11 |
| 4,551,726 | A | * | 11/1985 | Berg | ..................... H01Q 15/18 342/7 |
| 4,843,396 | A | * | 6/1989 | Macikunas | ............ H01Q 15/18 342/7 |
| 4,884,076 | A | * | 11/1989 | Schneeberger | ............ F41J 2/00 342/13 |
| 4,996,536 | A | * | 2/1991 | Broadhurst | ............ H01Q 15/20 342/7 |

(Continued)

*Primary Examiner* — Marcus Windrich
(74) *Attorney, Agent, or Firm* — Christopher A. Monsey

(57) ABSTRACT

An identification or messaging system is provided that has embodiments including a embodiment with a structure with different faces and a base with reflective or resonance panels which are positioned at different receiving angles to detect direct signals and amplify them including in a sequence to be detected by an active emitter that emits electromagnetic radiation that is reflected and steered or resonated off or with the panels. An emitter can be an aerial platform with the emitter and a library of reflected or resonated signals that are associated with a particular sequence of panels on the structure which are associated with a particular entity identification or message. Thermal patterned and/or magnetic patterned panels (e.g., for backplane beamforming) and return signal steering can also be provided. Embodiments with secondary signaling systems can also be provided. A variety of various embodiments and methods are also provided.

15 Claims, 15 Drawing Sheets

(56) References Cited

U.S. PATENT DOCUMENTS

| | | | | |
|---|---|---|---|---|
| 6,664,916 B1* | 12/2003 | Stafford | ............ | G01S 13/91 |
| | | | | 342/159 |
| 8,344,933 B1* | 1/2013 | Kronfeld | ............ | G01S 7/006 |
| | | | | 342/25 R |
| 2010/0001895 A1* | 1/2010 | Leeson | ............ | G01S 1/024 |
| | | | | 342/36 |
| 2012/0162014 A1* | 6/2012 | Wu | ............ | G01S 5/10 |
| | | | | 342/387 |
| 2014/0062792 A1* | 3/2014 | Schantz | ............ | G01S 5/0252 |
| | | | | 342/451 |
| 2015/0280326 A1* | 10/2015 | Arii | ............ | G01S 7/024 |
| | | | | 342/5 |

* cited by examiner

Providing PAR unit (e.g. Fig 1.) with a plurality of different removable/re-attachable RFFPs including a number of pairs of identical RFFPs that have antenna element pattern embodiments configured to resonate or reflect one or more first RF signals from one or more airborne RF transmitters such as, e.g., described herein to generate a particular altered RF signal, wherein the antenna element pattern embodiments can include conductive materials formed in different patterns such as, e.g., RFID, a plurality of fractal patterns with each fractal element of the pattern associated with a wavelet transform element, etc.

101

Selecting one or more of the plurality of different RRFPs having a said antenna pattern associated with a predetermined message or condition stored in a library (e.g., identification of a particular entity or type of entity that is stored in a library associated with an embodiment of the invention) (hereinafter "selected RRFP").

103

Position and configure one or more faces or surfaces of said PAR unit with said one or more of the selected RRFPs (e.g., pairs) and orient said PAR and one or more particular said faces or surfaces with at least one said selected RRFPs with respect to a skyward point or direction of travel of one or more predetermined aerial platforms generating a first RF signals that resonates or reflects altered RF signals from said one or more selected RRFPs and has said library.

105

Provide said aerial platform, position with respect to the PAR and selected RRFP and oriented faces or surfaces and generate said first RF signals towards said PAR.

107

Operating an RF signal detection system on said aerial platform to detect one or more resonated or reflected altered RF signals from said selected one or more RRFPs.

109

Correlating said predetermined message or condition in said library with said detected altered RF signals.

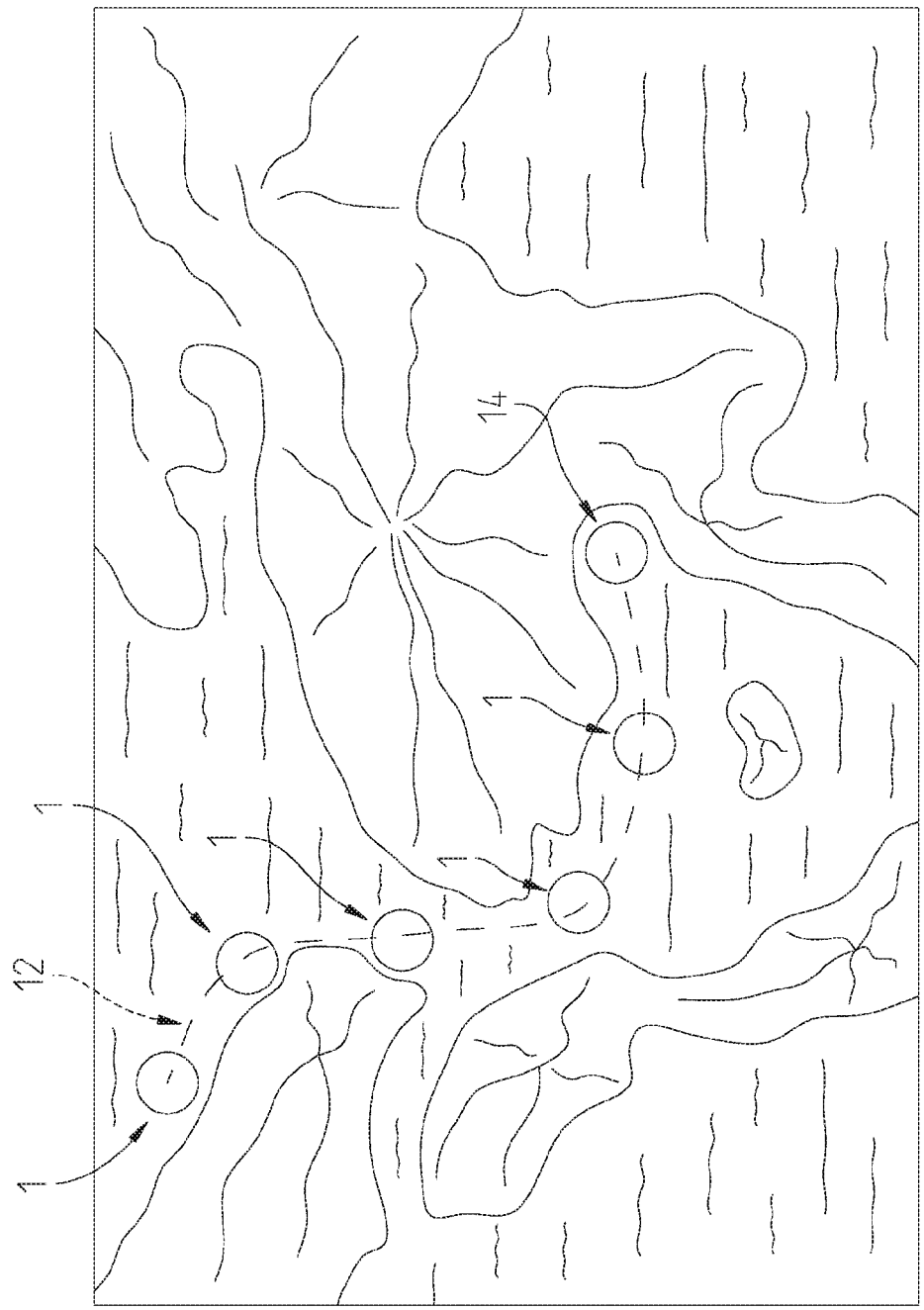

```
┌─────────────────────────────────────────────────────────────┐
│        Providing a plurality of PAR units (e.g. Fig 1.).    │
└─────────────────────────────────────────────────────────────┘
                    ╲─301
┌─────────────────────────────────────────────────────────────┐
│    Selecting one or more RRFPs generating an altered RF     │
│    signal in response to an initial RF signal for each      │
│    said PAR unit associated with a predetermined message    │
│    or condition (e.g., status of an entity or other         │
│    object, request from the entity, identity of the entity) │
│    associated with the entity that is traversing a path     │
│    (hereinafter selected RRFPs) and storing identifier      │
│    data associated with the one or more RRFPs and related   │
│    message or condition in a database.                      │
└─────────────────────────────────────────────────────────────┘
                                              303─╱
┌─────────────────────────────────────────────────────────────┐
│  Positioning and configuring each of said plurality of      │
│  said PAR units with said selected RRFPs along a path       │
│  (e.g. Fig 3) with respect to a predetermined aerial        │
│  platform orientation and path that will be generating      │
│  said initial RF signals that resonates or reflect from     │
│  at least one said selected RRFPs.                          │
└─────────────────────────────────────────────────────────────┘
                    ╲─305
┌─────────────────────────────────────────────────────────────┐
│   Providing said aerial platform, traversing an area in     │
│   proximity to said path, and generating said initial RF    │
│   signals towards at least one said RRFP.                   │
└─────────────────────────────────────────────────────────────┘
                                              307─╱
┌─────────────────────────────────────────────────────────────┐
│   Operating an RF signal detection system on said aerial    │
│   platform to detect one or more said altered RF signals    │
│   from one or more said selected RRFPs (hereinafter         │
│   detected altered RF signals).                             │
└─────────────────────────────────────────────────────────────┘
                    ╲─309
┌─────────────────────────────────────────────────────────────┐
│   Correlating said predetermined message or condition       │
│   with said detected altered RF signals using said database.│
└─────────────────────────────────────────────────────────────┘
                                              311─╱
┌─────────────────────────────────────────────────────────────┐
│ Determining said path and locating a final said PAR end     │
│ point defined by one of said PAR units at an end point      │
│ of said path.                                               │
└─────────────────────────────────────────────────────────────┘
                    ╲─313
┌─────────────────────────────────────────────────────────────┐
│ Identifying an operator of said PAR units at said end point │
│ based on said message or condition based on a look up in    │
│ said database that comprises an identity of said operator   │
│ of said PAR units associated with one or more said          │
│ detected RRFPs.                                             │
└─────────────────────────────────────────────────────────────┘
                      Fig. 4            315─╱
```

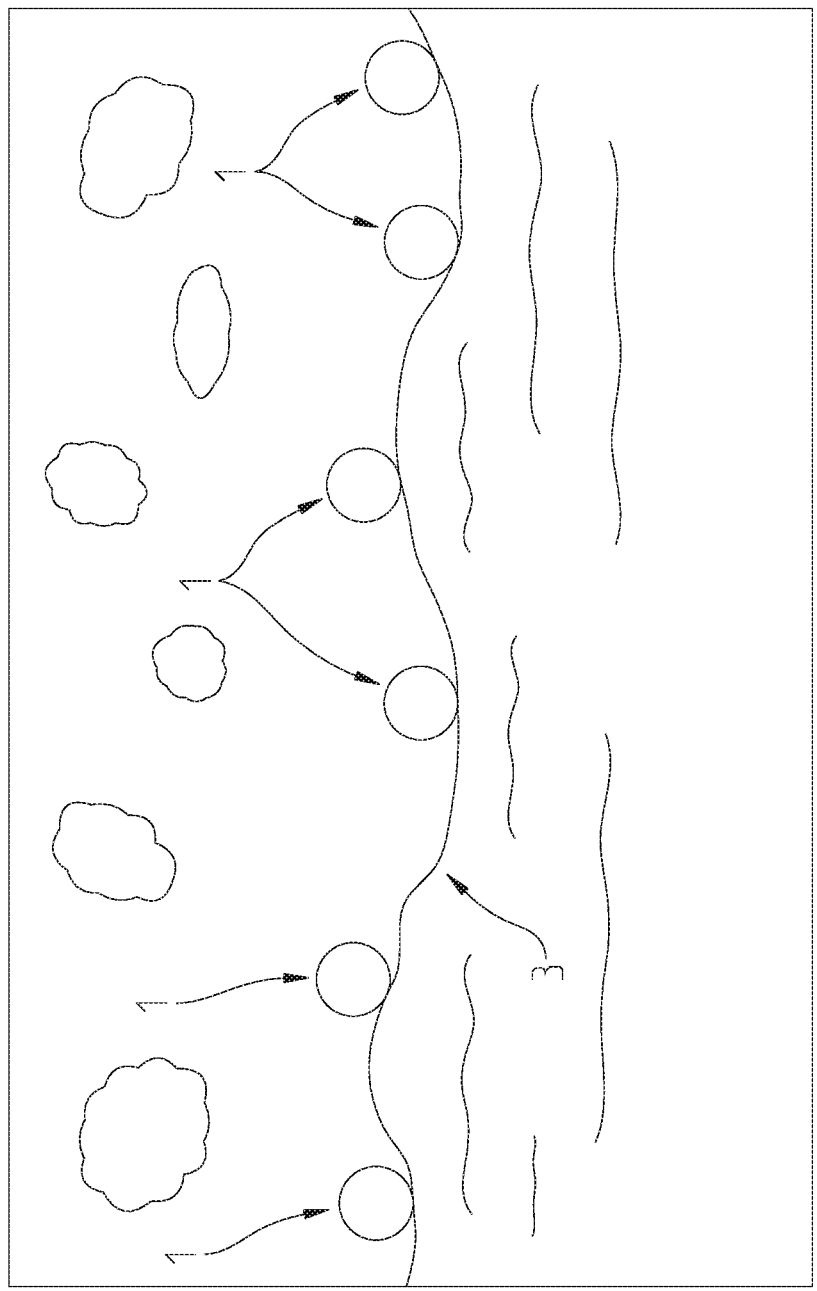

Providing a plurality of PAR units (e.g. Fig 1.) where each PAR is fitted with one or more RRFPs associated with an identification data for a specific vessel, aircraft, or entity, wherein each RRFP is configured with an antenna operable to reflect or resonate a first RF signal to produce an altered RF signal, wherein the identification data and altered RF signal are saved into a RRFP/identification correlated database.

— 501

Releasing a plurality of said PAR units in a body of water based on a predetermined condition, wherein each of said plurality of PAR units is oriented in a different position due to wave motion, said predetermined condition comprising a condition where an operator of the vessel, aircraft, or entity desires to be located by at least an aerial search aircraft.

505 —

Providing said aerial platform, traversing an area in proximity to said PAR units, and generating said first RF signals which are received by at least one PAR unit's RRFP.

— 507

Operating RF signal detection system on said aerial platform to detect one or more said SPAR units' altered RF signal.

509 —

Identifying a location of said one or more said PAR units based on said altered RF signals and identifying said identification data associated with the detected said altered RF signals.

---701 — Providing one or a plurality of PAR units (e.g. Fig 1.) comprising a plurality of RRFPs configured with one or more antenna elements adaped to reflect or resonate with an initial RF signal to generate an altered RF signal, said RRFPs are positioned on said PAR input in different locations and oriented in different directions, said RRFPs comprise single or pairs of said antenna elements, wherein each said RRFP is associated with an identity of an entity or a first message, said RRFP's associated altered RF signal pattern and said identity or said first message is saved in a database.

---703 — Providing a plurality of panel covers having a shape of said RRFPs configured to be transparent to RF signal while blocking visual light signals.

---705 — Placing said covers on one or more RRFPs of said one or a plurality of PAR units.

---707 — Operating RF signal detection system on said aerial platform to detect one or more said PAR units from said altered RF signals from one or more RRFP on said PAR units through said covers.

---709 — Identifying a location of said one or more said PAR units or said first message based on said altered RF signals based on said database identity or said message and RRFP altered RF signal data.

Fig. 8A

```
┌─────────────────────────────────────────────────────────────────┐
│   Providing one or a plurality of PAR units (e.g. Fig 1.) comprising a │
│   plurality of RRFPs configured with one or more antenna elements │
│   adapted to reflect or resonate with an initial RF signal to generate │
│   an altered RF signal, said RRFPs are positioned on said PAR input │
│   in different locations and oriented in different directions, said RRFPs │
│   comprise single or pairs of said antenna elements, wherein each said │
│   RRFP is associated with an identity of an entity or a first message, │
│   said RRFP's associated altered RF signal pattern and said identity or │
│          said first message is saved in a database.             │
└─────────────────────────────────────────────────────────────────┘
                              ╲─721
┌─────────────────────────────────────────────────────────────────┐
│    Selecting one or more panels of said PAR unit associated with a │
│       predetermined message or condition and one or more said RRFPs │
│       of said PAR unit not associated with said predetermined message │
│                         or condition.                           │
└─────────────────────────────────────────────────────────────────┘
                                                         723─╱
┌─────────────────────────────────────────────────────────────────┐
│       Positioning and configuring said PAR unit with respect to a │
│    predetermined aerial platform generating RF signals that resonates │
│         with said one or more said RRFPs associated with said    │
│                  predetermined message or condition.            │
└─────────────────────────────────────────────────────────────────┘
                              ╲─725
┌─────────────────────────────────────────────────────────────────┐
│           Providing and place RF shield cover on said RRFPs     │
│       not associated with said predetermined message or condition. │
└─────────────────────────────────────────────────────────────────┘
                                                         727─╱
┌─────────────────────────────────────────────────────────────────┐
│    Providing said aerial platform and generate said initial RF signals. │
└─────────────────────────────────────────────────────────────────┘
                              ╲─729
┌─────────────────────────────────────────────────────────────────┐
│  Operating RF signal detection system on said aerial platform to detect │
│     one or more said altered RF signals from said one or more RRFPs. │
└─────────────────────────────────────────────────────────────────┘
                                                         731─╱
┌─────────────────────────────────────────────────────────────────┐
│     Correlating said predetermined message or condition or identity │
│                with said detected altered RF signals.           │
└─────────────────────────────────────────────────────────────────┘
                              ╲─733
┌─────────────────────────────────────────────────────────────────┐
│         Identifying and locating said entity based on said      │
│                     correlation at Step 733.                    │
└─────────────────────────────────────────────────────────────────┘
                                                         735─╱
```

Fig. 8B

Providing one or a plurality of PAR units (e.g. Fig 1.) comprising a plurality of RRFPs configured with one or more antenna elements each adapted to reflect or resonate with an initial RF signal to generate an altered RF signal unique to each RRFP having a different antenna element, said RRFPs are positioned on said PAR input in different locations and oriented in different directions, said RRFPs comprise single or pairs of said antenna elements, wherein each said RRFP is associated with an identity element for an entity or a message element, said RRFP's associated altered RF signal pattern and said identity element or message element for each is saved in a database.
— 901

Selecting and placing one or more said RRFPs in a first RRFP sequence on said one or plurality of PAR units associated with a first predetermined message or condition and optionally also a first identification sequence comprising one or more said identify elements and saving in said database as said first predetermined message or condition sequence and a first entity identification element sequence comprising a sequence of said identify elements.
903

Positioning and configuring said PAR unit with respect to a potential path of a predetermined aerial platform generating RF signals that resonates with said one or more said first RRFP sequence associated with said first predetermined message or condition and said first entity identification element sequence.
— 905

Providing said aerial platform and generating said initial RF signals in a vicinity of said one or said plurality of PAR units.
907

Operating RF signal detection system on said aerial platform to detect one or more said altered RF signals from said one or more RRFPs associated with said first RRFP sequence.
— 909

Correlating said first predetermined message or condition or identity with said detected altered RF signals from said one or more RRFPs associated with said first RRFP sequence.
911

Fig. 10A

Changing one or more said RRFPs on said PAR unit into a second RRFP sequence as said first predetermined message or condition changes to a second predetermined message or condition associated with said second RRFPs sequence that generate a second altered RF signals.

—913

Operating said RF signal detection system on said aerial platform to detect said second altered RF signals from said second sequence of said RRFPs.

915

Correlating said second predetermined message or condition or identity with said detected second altered RF signals.

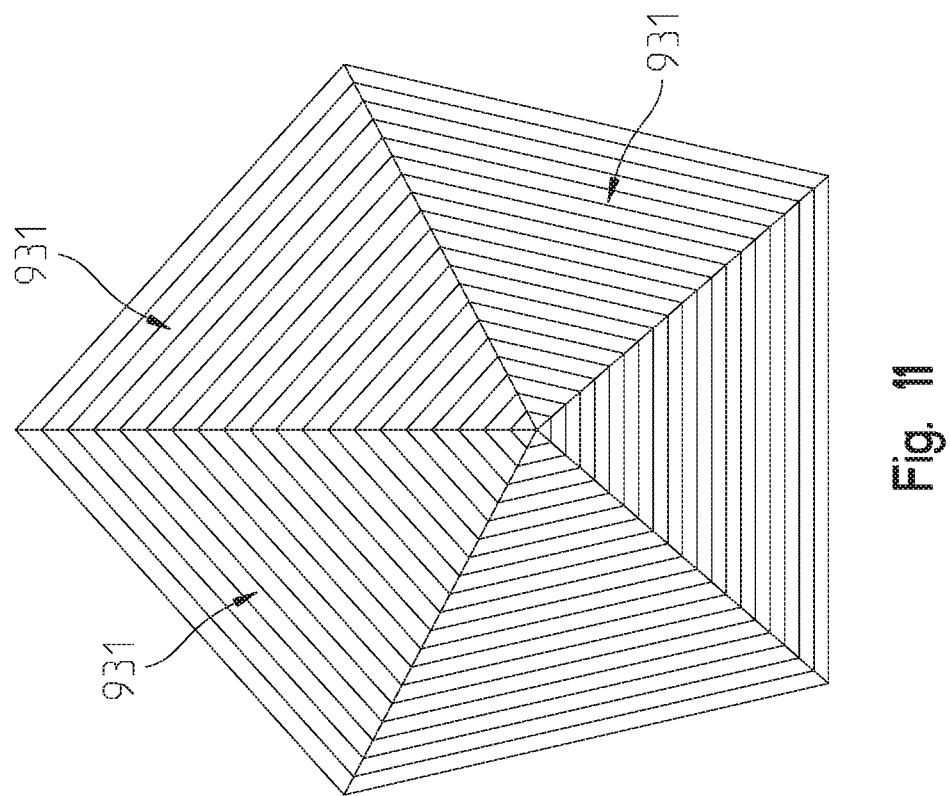

IDENTIFICATION OR MESSAGING SYSTEMS AND RELATED METHODS

CROSS-REFERENCE TO RELATED APPLICATIONS

The present application claims priority to U.S. Provisional Patent Application Ser. No. 62/162,889, filed May 18, 2015, entitled "IDENTIFICATION OR MESSAGING SYSTEM AND RELATED METHODS," the disclosure of which is expressly incorporated by reference herein.

STATEMENT REGARDING FEDERALLY SPONSORED RESEARCH OR DEVELOPMENT

The invention described herein was made in the performance of official duties by employees of the Department of the Navy and may be manufactured, used and licensed by or for the United States Government for any governmental purpose without payment of any royalties thereon. This invention (Navy Case 200,243) is assigned to the United States Government and is available for licensing for commercial purposes. Licensing and technical inquiries may be directed to the Technology Transfer Office, Naval Surface Warfare Center Crane, email: Cran_CTO@navy.mil.

BACKGROUND AND SUMMARY OF THE INVENTION

The present invention generally relates to an identification or messaging system. In particular, embodiments of the invention can include an identification or messaging system is provided that has embodiments including an embodiment with a structure with different faces and a base with reflective or resonance panels which are positioned at different receiving angles to detect direct signals and amplify them including in a sequence to be detected by an active emitter that emits electromagnetic radiation that is reflected and steered or resonated off or with the panels. An emitter can be an aerial platform with the emitter and a library of reflected or resonated signals that are associated with a particular sequence of panels on the structure which are associated with a particular entity identification or message. Thermal patterned and/or magnetic patterned panels (e.g., for backplane beamforming) and return signal steering can also be provided. Embodiments with secondary signaling systems can also be provided. A variety of various embodiments and methods are also provided.

Embodiments of the invention can include radio frequency (RF) based systems as well as other electromagnetic spectrum based structures and methods. Additional exemplary features can include removable panels, light blocking panels, RF signal blocking panels, a visual signaling system such as a flare or high intensity light beacon as well which are activated based on signals passing through, or resonating with, the elements of the panels such as RF signals as well as other systems which include additional sensors such as a light sensor configured to detect particular frequencies of light (as well as intensities) such as a laser interrogator which activates the visual signaling system. Exemplary visual signaling systems can also be replaced with a non-visual system such as an infra-red (IR) and millimeter wave (mmWave) beacons, etc. One embodiment can include a Polygonal Asymmetric Reflector (PAR) which uses a shape or frame to mount a panel which has receiver system such as RF panels on various surfaces that increases a probability of generating a return to a source (e.g., an antenna). An embodiment, such as a PAR, can also have a certain shape that can be readily detected by a system that employs pattern recognition which is not found in an expected terrain or a normal terrain or area. Another embodiment can also include powered variants which have a power generation source such as solar panel or a movement powered electrical generator which provides power for generating an active signal in response to being interrogated by an emitter. Additional embodiments can include a signal detector attached to various antennas or elements of the invention that can detect where a signal transmitter is located relative to the embodiment so that it can activate systems in the embodiment which can interact with the signal transmitter that is attempting to interact with an embodiment of the invention.

Additional embodiments can include a capability to actively change a signal type emitting autonomously from the PAR, i.e. panels layered with a modulator, e.g., a Liquid Crystal Modulator (LCM), for features such as encryption, PAR health status, etc. Having an organic display would also allow an operator to alter a frequency of a signal (e.g. light, RF signal, etc.) incident to the PAR by changing a dialectic constant of a material over a PAR antenna or receiving or reflecting element. By actively, and adaptively altering the panels permeability and permittivity, an operator or designer can ensure that a PAR embodiment is 'jam resistant' and or aid in preventing undesired or unintentional interference.

An alternative embodiment can also include a variant which has an addition of materials or structures that form detectable thermal patterns or signatures. For example, edges of a PAR or frame/structure can have a material with a different blackbody radiation than surrounding air or other materials on the PAR or frame/structure. A thermal camera can detect these thermal patterns or signatures. This would provide a second or additional identification or messaging capability as such pattern or signature elements could be designed to be modifiable by an operator. For example, tubes of liquid could be coupled to a PAR, e.g., at edges, which can detected by a thermal imager and then compared to a library or look up table of patterns. These patterns can be created by individual elements as well as by panels which can be reconfigured/replaced/added the PAR or mounting structure. Such reconfiguration can also be done by, e.g., the LCD system discussed above which be on one or more faces of the PAR or mounting structure.

Additional features and advantages of the present invention will become apparent to those skilled in the art upon consideration of the following detailed description of the illustrative embodiment exemplifying the best mode of carrying out the invention as presently perceived.

BRIEF DESCRIPTION OF THE DRAWINGS

The detailed description of the drawings particularly refers to the accompanying figures in which:

FIG. 2 shows an exemplary method for using one embodiment of an exemplary system such as, e.g., shown in FIGS. 1A and 1B;

FIG. 3 shows an exemplary disposition of an exemplary system along a path of travel over a geographic area;

FIG. 4 shows a method associated with one embodiment of an exemplary system, e.g., such as shown in FIGS. 1A and 1B, along a path of travel, e.g., such as shown in FIG. 3;

FIG. 5 shows another exemplary disposition of an exemplary PAR system in a water application such as, e.g., in an ocean environment;

FIG. 6 shows another exemplary method of use of an exemplary system in accordance with another embodiment of the invention, e.g., in the water application shown in FIG. 5;

FIG. 8A shows an exemplary method in accordance with one embodiment of the invention relative to at least some of the covers discussed in relation to FIGS. 7A and 7B;

FIG. 8B shows another exemplary method in accordance with another embodiment of the invention relative to some of the covers discussed in relation to FIGS. 7A and 7B;

FIG. 10 shows an exemplary method in accordance with another embodiment of the invention using, e.g, a system such as the embodiment shown in FIGS. 9A-9F;

FIG. 11 shows another exemplary PAR with another antenna configuration including a spiral monopole antenna formed across multiple faces;

DETAILED DESCRIPTION OF THE DRAWINGS

The embodiments of the invention described herein are not intended to be exhaustive or to limit the invention to precise forms disclosed. Rather, the embodiments selected for description have been chosen to enable one skilled in the art to practice the invention.

Figure 1B:
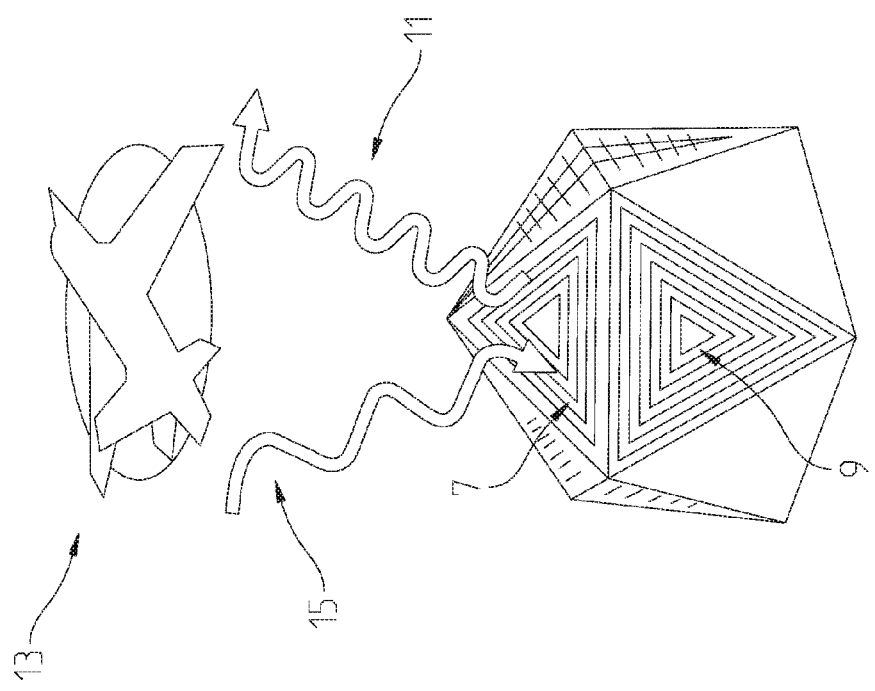
FIGS. 1A and 1B show an exemplary identification and/or messaging system having one exemplary structure comprising a Polygonal Asymmetric Reflector (PAR) unit with a number of RF reflective or resonating antenna panels associated with a particular identity or message.
Figure 1A:
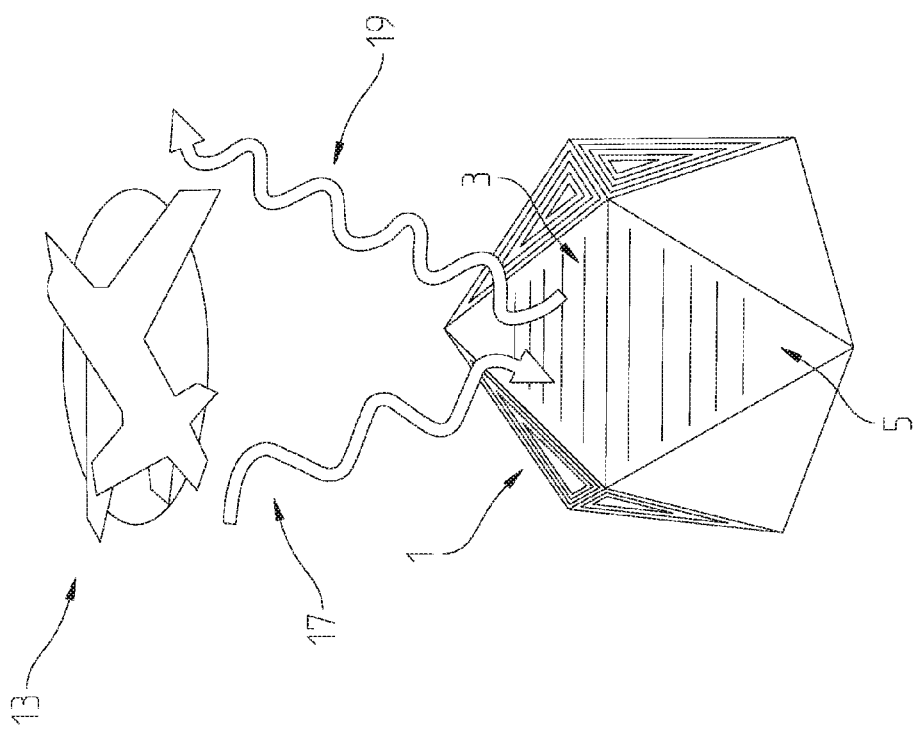

Referring initially to FIGS. 1A and 1B, an exemplary PAR unit 1 is provided comprising of a light weight material and covered with fixed or removable RF reflective or resonance panels with different antenna patterns on them. Panels in this embodiment are configured to reflect or resonate with RF signals. However, additional embodiments can include configurations which react to other electromagnetic spectrum such as visible light, IR, coherent light, etc. Note, a polygon structure is provided in this embodiment but additional embodiments can utilize other geometric shapes such as a triangle, or other structures which provide a base and surfaces to position the RF reflective or resonance panels. PAR 1 can be an inflatable design, a modular structure that can be assembled from flat panels with interlocking edges, or a fixed structure frame design. Exemplary antennas can be fractal antennas, RF identification (RFID) antennas, or other types of antennas that enable them to remotely or passively interact with a RF transmitter/receiver referred to herein for convenience as "Reflective RF Panels" or "RRFPs". RRFPs can be designed to be separatable from an underlying frame or surface section of a PAR 1 unit (e.g., panels that can be removably fixed to a frame or exterior surface attached to a frame of a PAR 1 unit). RRFPs can also be formed onto a surface of a PAR 1 unit and integral to its frame or exterior or other surface. RRFP 3 and 5 containing an identical antenna pattern can be placed in a configuration to provide a signaling capability in a direction or field of view (FOV) of interest. RRFP 7 and 9 containing another set of identical antenna patterns to each other but different from RRFP 3 and 5, are placed on a different side of PAR unit 1 to provide a signaling capability in a different direction or FOV of interest which can include a skyward orientation. All sides of the FIGS. 1A and 1B exemplary PAR unit 1 are covered with pairs of RRFPs, each pair composed of identical antenna patterns to each other but different from other pairs of RRFPs.

Aircraft 13 generates an RF signal 17 to PAR unit 1 from a direction facing towards an RRFP 3 and 5 which are received by RRFPs 3, 5 which then react with signal 17 based on a unique antenna pattern of RRFPs 3 and 5 resulting in reflection or resonance of an RF altered signal 19 back to aircraft 13. Aircraft 13 receives the altered RF signal 19 and compares it with on onboard library of altered RF signals recognizes the altered RF signal 19 from all other RF signals received aircraft 13 as an identification signal for a specific entity, such as a party in distress/lost (e.g. lost hiker, aircraft crash survivors) or other signaling entities such as, for example, friendly forces, firefighters identifying themselves and/or sending a specific message associated with a particular altered message.

In another example, aircraft 13 approaching a PAR unit 1 from a direction facing RRFPs 7 and 9 generates an RF signal 15 towards a PAR unit 1 resulting in RRFPs 7 and 9 to receiving and passively generating or reflecting a different altered RF signal 15 based on a unique antenna pattern of reflective RF panels 7 and 9 and reflect an altered RF signal 11 back to aircraft 13. Aircraft 13 recognizes the altered RF signal 11 from all other reflective signals returning to aircraft 13 which identifies the altered RF signal 11 as associated with RRFPs 7, 9.

RRFP panels can indicate identification as well as identification and a specific message. For example, a combination of RRFPs can provide a sequence of altered RF signals in one orientation. In another example, an aircraft can detect one altered RF signal and then use that point as a point of reference then rotate around a PAR 1 directing RF signals towards the PAR 1 which then reflects or resonates back altered RF signals in a sequence associated with a sequence of different removable RRFPs which are attached to the PAR 1 surfaces.

An active transmitter entity, such as an aircraft, can have a variety of architectures and emitters on board. For example, an embodiment of the invention can be designed to reflect/resonate an altered RF signal based on specific aircraft RF emitters such as a search radar, a weather radar, a fire control radar, etc. as well as a more specific type of emitter which is not designed for another task such as a purpose built RF system. An onboard system includes components that transmit RF signals and received altered RF signals as well as recognizing each altered RF signal and associating it with a particular RRFP as well as recognizing sequences of RRFPs and associating the sequences with a particular message or identification. Another embodiment can tie identification to a particular sequence of RRFPs versus a single RRFP identifier. Such sequences can be changed in order to ensure that such sequences are not copied or known by any others except an operator on board the active transmitter entity with knowledge of the actual sequence RRFPs positioned on the PAR 1.

Referring to FIG. 2, a method for using one embodiment of an exemplary PAR system, e.g., as in FIGS. 1A and 1B, is shown. At Step 101: Provide PAR unit (e.g. FIGS. 1A and 1B.) with a plurality of different removable/re-attachable RRFPs including a number of pairs of identical RRFPs that have antenna element pattern embodiments configured to resonate or reflect one or more first RF signals from one or more airborne RF transmitters such as, e.g., described herein to generate a particular altered RF signal, wherein the antenna element pattern embodiments can include conductive materials formed in different patterns such as, e.g., RFID, a plurality of fractal patterns with each fractal element of the pattern associated with a wavelet transform element, etc. At Step 103: Selecting one or more of the plurality of different RRFPs having a said antenna pattern associated with a predetermined message or condition stored in a library (e.g., identification of a particular entity or type of entity that is stored in a library associated with an embodiment of the invention) (hereinafter "selected RRFP"). At Step 105: Position and configure one or more faces or surfaces of said PAR unit with said one or more of the selected RRFPs (e.g., pairs) and orient said PAR and one or more particular said faces or surfaces with at least one said selected RRFPs with respect to a skyward point or direction of travel of one or more predetermined aerial platforms generating a first RF signals that resonates or reflects altered RF signals from said one or more selected RRFPs and has said library. At Step 107: Provide said aerial platform, position with respect to the PAR and selected RRFP and oriented faces or surfaces and generate said first RF signals towards said PAR. At Step 109: Operating an RF signal detection system on said aerial platform to detect one or more resonated or reflected altered RF signals from said selected one or more one or more RRFPs. Step 111: Correlating said predetermined message or condition in said library with said detected altered RF signals.

Referring to FIG. 3, another use of an embodiment of the invention is shown. A party moving through a path of travel 12. A plurality of PAR 1 embodiments can be dropped at different locations that can individually be detected by a transmitter aircraft or other party in order to localize a most current or last signaled location 14 of the party moving through the path of travel 12. Alternatively, embodiments of the invention can be prepositioned as navigation aids or landing aids for ground or airborne entities for use such as described herein.

Referring to FIG. 4, a method associated with one embodiment of a method of use associated with a PAR system. At Step 301: Providing a plurality of PAR units (e.g. FIG. 1). At Step 303: Selecting one or more RRFPs generating an altered RF signal in response to an initial RF signal for each said PAR unit associated with a predetermined message or condition (e.g., status of an entity or other object, request from the entity, identity of the entity) associated with the entity that is traversing a path (hereinafter selected RRFPs) and storing identifier data associated with the one or more RRFPs and related message or condition in a database. At Step 305: Positioning and configuring each of said plurality of said PAR units with said selected RRFPs along a path (e.g. FIG. 3) with respect to a predetermined aerial platform orientation and path that will be generating said initial RF signals that resonates or reflect from at least one said selected RRFPs. At Step 307: Providing said aerial platform, traversing an area in proximity to said path, and generating said initial RF signals towards at least one said RRFP. Step 309: Operating an RF signal detection system on said aerial platform to detect one or more said altered RF signals from one or more said selected RRFPs (hereinafter detected altered RF signals). Step 311: Correlating said predetermined message or condition with said detected altered RF signals using said database. Step 313: Determining said path and locating a final said PAR end point defined by one of said PAR units at an end point of said path. Step 315: Identifying an operator of said PAR units at said end point based on said message or condition based on a look up in said database that comprises an identity of said operator of said PAR units associated with one or more said detected RRFPs.

Referring to FIG. 5, another embodiment of use of a number of PAR systems is shown. An ocean surface 3 is shown with waves where a plurality of PAR systems 1 is distributed from one or more release points that are floating on the ocean surface 3. An aircraft can detect RRFPs on the PAR systems and thereby aid in locating an entity on the ocean surface or even below the surface. For example, an entity in distress can release a plurality of PAR systems to aid in search and rescue. An aircraft can be configured with a plurality of PAR systems which auto or manually release from the aircraft in the event to of a crash. Alternative embodiments of the invention can include a system where a ship, aircraft, vessel, or mobile object, including space ship, can release a number of PARs simultaneously which can be, for example, inflatable structures which auto inflate upon a certain condition occurring or manual operation. For example, an auto release system can include a water detector coupled with a controller on an aircraft or an interior section of a ship that designed to have water therein. When the water sensor detects water, then an auto release function can be triggered releasing one or more PAR systems to provide an ability to increase search and rescue probabilities. PAR systems can be made of high strength material that is resistive of damage or puncture. An inflation cartridge can be installed into a PAR system along with an activation system such as a pull tab or an electrically activated valve or activation system.

Referring to FIG. 6, another method for use with an embodiment of the invention is shown. Step 501: Providing a plurality of PAR units (e.g. FIG. 1.) where each PAR is fitted with one or more RRFPs associated with an identification data for a specific vessel, aircraft, or entity, wherein each RRFP is configured with an antenna operable to reflect or resonate a first RF signal to produce an altered RF signal, wherein the identification data and altered RF signal are saved into a RRFP/identification correlated database. At Step 505: Releasing a plurality of said PAR units in a body of water based on a predetermined condition, wherein each of said plurality of PAR units is oriented in a different position due to wave motion, said predetermined condition comprising a condition where an operator of the vessel, aircraft, or entity desires to be located by at least an aerial search aircraft. Step 507: Providing said aerial platform, traversing an area in proximity to said PAR units, and generating said first RF signals which are received by at least one PAR unit's RRFP. Step 509: Operating RF signal detection system on said aerial platform to detect one or more said SPAR units' altered RF signal. Step 511: Identifying a location of said one or more said PAR units based on said altered RF signals and identifying said identification data associated with the detected said altered RF signals.

Figure 7B:
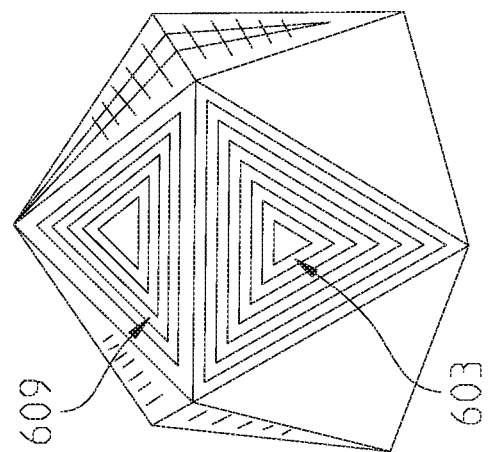
FIGS. 7A and 7B show an alternative embodiment of the invention which includes covers that obstruct light or non-RF wavelengths as well as covers that obstruct RF signals which are placed on one or more sections of one embodiment of the invention to prevent remote visual inspection of antenna elements one or more sections of the embodiment or reflection or resonance from covered panels to selectively prevent an RF response from the embodiment.
Figure 7A:
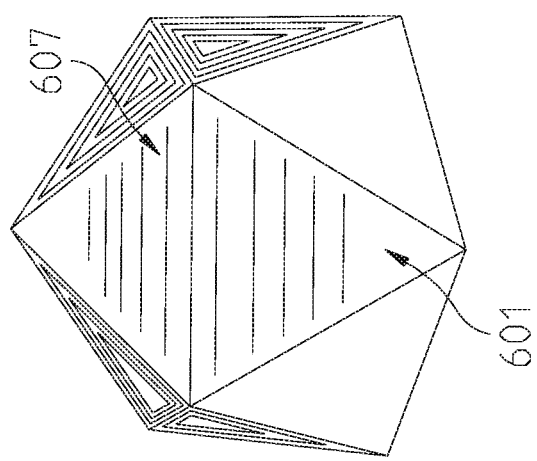
Figure 9A:
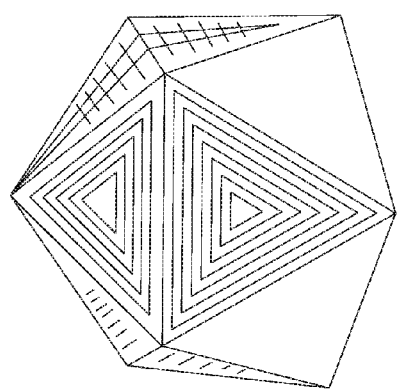
FIGS. 9A-9F show another exemplary embodiment of the invention with a variety of removable and replaceable covers used to "reprogram" or reconfigure an embodiment of the invention to provide different or flexible messaging or identification capabilities.
Figure 9B:
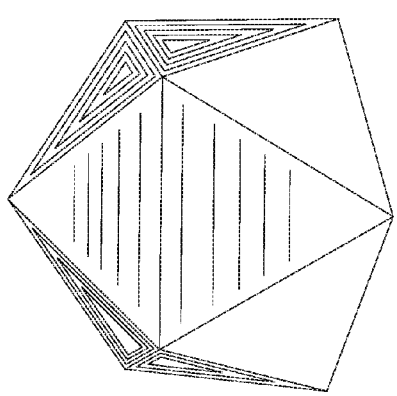
Figure 9F:
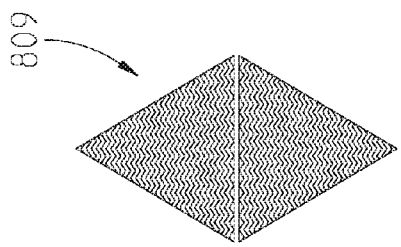
Figure 9E:
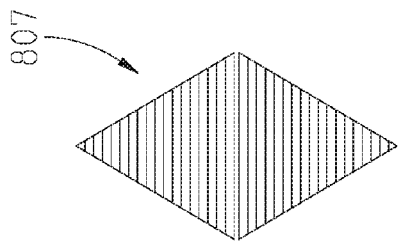
Figure 9D:
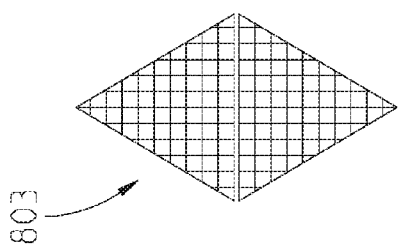
Figure 9C:
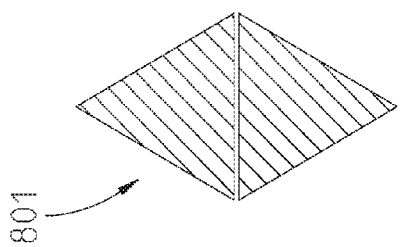

Referring to FIGS. 7A and 7B, another alternate embodiment of the invention is shown. In particular, a number of covers 601, 603, 607, and 609 are shown covering some of the RRFPs on a PAR system. Covers 601-609 can be RF opaque covers that only obstruct light or non-RF wavelengths so as to hide patterns on the RRFPs or even can be configured as camouflage to aid in blending a PAR system in with its surroundings. Another embodiment can include RF shielding covers which permit altering a PAR system's RRFP response to RF signals by blocking RF signals and so thereby selectively alter the PAR's collection of RRFPs response to an RF signal from, e.g., an aircraft or emitter entity. In this way, the PAR system can be prevented from responding to RF signals until a time at which a PAR operator wishes to actually utilize a PAR system.

Referring to FIG. 8A, an exemplary method of using an exemplary embodiment of a PAR system is provided. Step 701: Providing one or a plurality of PAR units (e.g. FIG. 1.) comprising a plurality of RRFPs configured with one or more antenna elements adapted to reflect or resonate with an initial RF signal to generate an altered RF signal, said RRFPs are positioned on said PAR input in different locations and oriented in different directions, said RRFPs comprise single or pairs of said antenna elements, wherein each said RRFP is associated with an identity of an entity, said RRFP's associated altered RF signal pattern and said identity is saved in a database. Step 703: Providing a plurality of panel covers having a shape of said RRFPs configured to be transparent to RF signal while blocking visual light signals. Step 705: Placing said covers on one or more RRFPs of said one or a plurality of PAR units. Step 707: Operating RF signal detection system on said aerial platform to detect one or more said PAR units from said altered RF signals from one or more RRFP on said PAR units through said covers. Step 709: Identifying a location of said one or more said PAR units based on said altered RF signals based on said database identity and RRFP altered RF signal data.

Referring to FIG. 8B, another method in accordance with one embodiment of the invention is provided using RF signal blocking covers is provided. Step 721: Providing one or a plurality of PAR units (e.g. FIG. 1.) comprising a plurality of RRFPs configured with one or more antenna elements adapted to reflect or resonate with an initial RF signal to generate an altered RF signal, said RRFPs are positioned on said PAR input in different locations and oriented in different directions, said RRFPs comprise single or pairs of said antenna elements, wherein each said RRFP is associated with an identity of an entity, said RRFP's associated altered RF signal pattern and said identity is saved in a database. Step 723: Select one or more said RRFPs of said PAR unit associated with a predetermined message or condition and one or more said RRFPs of said PAR unit not associated with said predetermined message or condition. Step 725: Position and configure said PAR unit with respect to a predetermined aerial platform generating RF signals that resonates with said one or more said RRFPs associated with said predetermined message or condition. Step 727: Place RF shield cover(s) on said RRFPs not associated with said predetermined message or condition. Step 729: Providing said aerial platform and generating said initial RF signals. Step 731: Operating an RF signal detection system on said aerial platform to detect one or more said altered RF signals from said one or more RRFPs. Step 733: Correlating said predetermined message or condition with said detected altered RF signals. Step 735: Identifying and locating said entity based on said correlation at Step 733.

Referring to FIGS. 9A-9F, another embodiment of the invention is shown with PAR units 805, 806 that are further provided with a variety of RRFPs which can be covered or removed and replaced with different RRFPs 801, 803, 807, 809. The different RRFPs 801, 803, 807, 809, can be placed on the PAR units 805, 806 to signify different messages or identification sequences that can be detected and interpreted by an RF emitter with an RF receiver which detects altered RF signals emitted from various RRFPs. As discussed above, in one embodiment a platform with the RF emitter/receiver has a control system with a library that provides a look up capability to associate detected altered RF signals reflected or resonated from the RRFPs placed on one or more PARs 805, 806 to determine an entity identification associated with the RRFP sequences or a message associated with the RRFP sequences.

Referring to FIG. 10, an exemplary method associated with use of the FIGS. 9A-9F embodiment is shown. Step 901: Providing one or a plurality of PAR units (e.g. FIG. 1.) comprising a plurality of RRFPs configured with one or more antenna elements each adapted to reflect or resonate with an initial RF signal to generate an altered RF signal unique to each RRFP having a different antenna element, said RRFPs are positioned on said PAR input in different locations and oriented in different directions, said RRFPs comprise single or pairs of said antenna elements, wherein each said RRFP is associated with an identity element for an entity or a message element, said RRFP's associated altered RF signal pattern and said identity element or message element for each is saved in a database. Step 903: Selecting and placing one or more said RRFPs in a first RRFP sequence on said one or plurality of PAR units associated with a first predetermined message or condition and optionally also a first identification sequence comprising one or more said identify elements and saving in said database as said first predetermined message or condition sequence and a first entity identification element sequence comprising a sequence of said identify elements. Step 905: Positioning and configuring said PAR unit with respect to a potential landing or flight path of a predetermined aerial platform generating RF signals that resonates with said one or more said first RRFP sequence associated with said first predetermined message or condition and said first entity identification element sequence. Step 907: Providing said aerial platform and generating said initial RF signals in a vicinity of said one or said plurality of PAR units. Step 909: Operating RF signal detection system on said aerial platform to detect one or more said altered RF signals from said one or more RRFPs associated with said first RRFP sequence. Step 911: Correlating said first predetermined message or condition or identity with said detected altered RF signals from said one or more RRFPs associated with said first RRFP sequence. Step 913: Changing one or more said RRFPs on said PAR unit into a second RRFP sequence as said first predetermined message or condition changes to a second predetermined message or condition associated with said second RRFPs sequence that generate a second altered RF signals. Step 915: Operating said RF signal detection system on said aerial platform to detect said second altered RF signals from said second sequence of said RRFPs. Step 917: Correlating said second predetermined message or condition or identity with said detected second altered RF signals.

FIG. 11 shows another exemplary PAR with another antenna configuration including a spiral monopole antenna formed across multiple faces 931. In this embodiment in FIG. 11, five faces are shown with the spiral monopole antenna disposed on them so that a center section of the PAR defines a center section and point of origin for the spiral monopole antenna. This spiral monopole antenna can have receiving characteristics of a larger whip or monopole antenna. On an opposing side (not shown) of the FIG. 11 embodiment two faces of the PAR (not shown) have a dipole antenna formed on them and used in pairs of units. (see FIGS. 9A-9F, 807).

Figure 12:
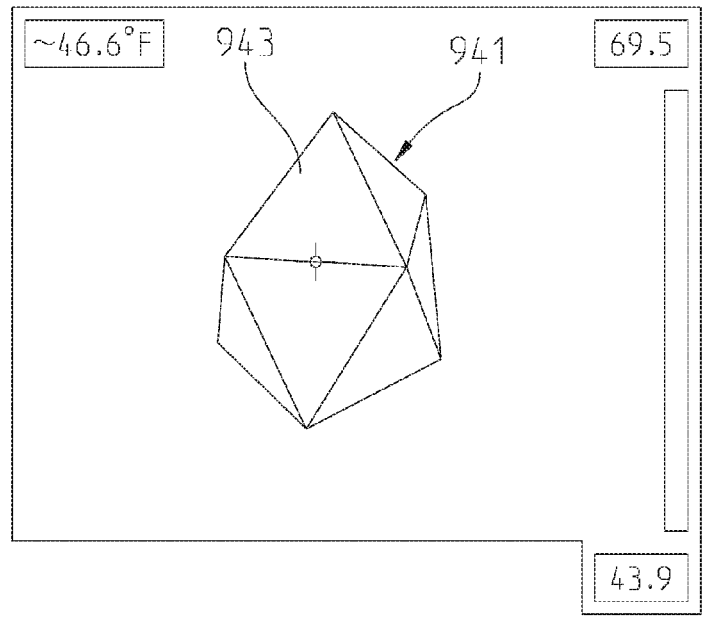
FIG. 12 shows another exemplary identification and/or messaging system, e.g., PAR, with panel edge structures having different thermal gradients at edges of PAR panels to increase thermal signature contrast at PAR panel edges including at least one monopole antenna formed from copper antenna strip material that are super-cooling an edge as contrasted with panel edge structures and also different energy reflection from other sources, e.g., from ground sources.

FIG. 12 shows another exemplary identification and/or messaging system, e.g., PAR, with panel edge structures 941 having different thermal gradients at edges of PAR panels to increase thermal signature contrast at PAR panel edges. The FIG. 12 embodiment also shows at least panel structure 943 with one monopole antenna formed from copper antenna strip material that are super-cooling a panel as contrasted with panel edge structures and also different energy reflection from other sources, e.g., from ground sources. SPAR thermal edge gradient was enhanced by creating an "edge cord". Edge structures 941 can be formed with, e.g., one part Naphthenic Oil with two parts Acrylic Polymer impregnated into 100% Acrylic woven fiber yarn. Then final panel edge structures 941 formed with edge cord can then be over coated with Portland cement. An alternative embodiment of edge structure 941 construction can utilize a ¼ inch thin walled clear plastic flexible tube in which the "edge cord" is threaded through the tube before being installed on the PAR. Due to a minor chemical heating process combined with the different temperature black body radiation given off by edge structure 941 materials provides an exemplar PAR structure and the surrounding air temperature to be slightly offset. Exemplary PAR edge structures 941 enhance unique PAR shapes in, e.g., an IR spectrum. Also, in exemplary embodiments external air temperature can play a significant role in cooling different sections of a PAR body due to its unique physical alignment of the sides that can increase an exemplary PAR IR image identification characteristic. Multi sided PAR can be easily discernable in the background clutter. The exemplary PAR can give off a varied black body radiation signature. Aircraft or ground vehicles utilizing a computer controlled and library comparison optical system set to function in the IR range and capable to compare similar objects with the distinct PAR shape will be able to detect its presence thus indicating it is a "vehicle of or round troops of interest".

Figure 13:
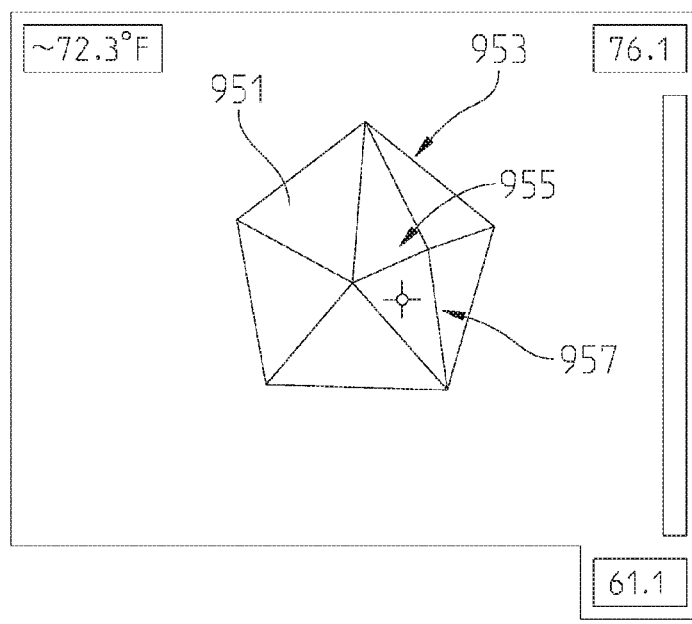
FIG. 13 shows another exemplary identification and/or messaging system, e.g., PAR, with additional examples of different thermal gradients at edges of PAR panels that shows a different response by panel edge structures at a different ambient temperature.

FIG. 13 shows another exemplary identification and/or messaging system, e.g., PAR, with additional examples of different thermal gradients at edges 953 of PAR panels 951 that show a different response by panel edge structures 953 at a different ambient temperature.

Figure 14:
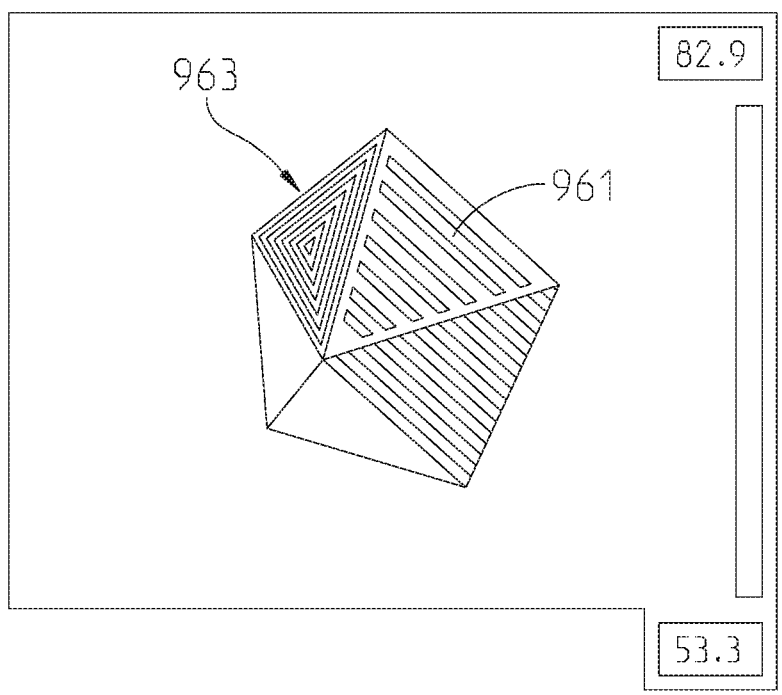
FIG. 14 shows another an exemplary identification and/or messaging system, e.g., PAR, that show how different structures reflect and/or emit different thermal profiles from different angles of view.

FIG. 14 shows another an exemplary identification and/or messaging system, e.g., PAR, that show how different panel, e.g., 961 and edge structures 963 reflect and/or emit different thermal profiles from different angles of view. FIG. 14 also shows inclusion of magnetic layers which are placed on several panels to alter backplane electrical properties of antenna structures placed over them. Such magnetic layers have both infrared or thermal gradient properties that are different than other faces and affects an antenna's backplane field of influence which improve electromagnetic receive ability (e.g., makes backplane larger than it normally would be and thus, among other things, permits beamforming or controlling a shape of an antenna emissions). Can also create nulls or dead spots in one or more faces of an exemplary identification and/or messaging system's antenna or reduce, e.g., side lobes, etc.

An additional embodiment can include a secondary, e.g., visual, signaling system such as a flare or high intensity light beacon as well which are activated based on signals passing through elements of the panels such as RF signals as well as other systems which include additional sensors such as a light sensor configured to detect particular frequencies of light (as well as intensities) such as a laser interrogator which activates the visual signaling system. The visual signaling system can also be replaced with a non-visual system such as an infra-red (IR) beacon, etc. The secondary signaling system can also include a system which emits a particular set of signals such as Morse code, such as SOS, or a specific code associated with an operator of a PAR, e.g., identification, etc., upon activation.

Another embodiment can include a system which rotates a structure such as the PAR which can be used as a form of modulation as the rotation will produce a detectable change in return signals from the PAR or reflection/emitter/resonator, etc. structure. A controls system for rotational control can include a library of messages which are associated with different rotational speeds as well as date/time of rotation schedule that can be manually selected or automatically controlling rotation of the PAR or reflection/emitter/resonator, etc. structure. A power source would be supplied to include a wind up system, etc. One variant can include a wind powered version where an entity sending a signal towards the PAR or reflection/emitter/resonator has wind speed or approximate wind speed known which can be used to create a modulation scheme that is somewhat random and difficult for an undesired third party to known in advance. For example, a UAV or aircraft operating in an area of the PAR or reflection/emitter/resonator can determine local wind speed and use that as a basis for determining if the PAR or rotational reflection/emitter/resonator structure is recognized as associated with an authorized or authenticated/verified operator or user. A wind powered system could use windmill or turbine structure to rotate the PAR or reflector/emitter/resonator. Exemplary turbine or windmill embodiments can also be used as an additional system or process of performing recognition or authentication/verification functions as differently sized turbine or windmill vanes can be recognized as well as a color scheme on the vanes. Another mechanism for providing authentication or verification of an operator's identity is to provide a speed control for a mobile variant such as a brake or some type of friction control which causes a differential rotation of the turbine or windmill as a vehicle moves at any particular speed. So for example, a vehicle with a PAR or reflector/emitter/resonator structure is moving at 50 miles per hour which would ordinarily cause the structure to rotate at a particular speed but the brake causes it to rotate at a percentage or range of rotation speed or spin rate that is e.g., fifty percent less than it otherwise would rotate. A rotational structure can also collectively provide multiple faces which collectively form a sequence of emissions or radiation/radiated/resonated energy in reaction to an incident signal where speed of rotation may or may not be an additional modulating aspect of an identification or messaging function.

Another embodiment can add a jitter control to impart vibration to a PAR or reflector/emitter/resonator structure that responds to an input signal incident to the structure and powers a vibration imparting mechanism to the structure.

Various embodiments are usable for a wide variety of civil applications. For example, can put embodiments of the invention in areas such as trackless wilderness, arctic or Antarctic regions, jungle or heavy vegetation areas, dust storm areas, foggy areas, etc. to provide a means of navigation or an ability to follow another group. Another application can be for border patrols that employ aerial vehicles so that known and authorized groups can use a relatively inexpensive system such as one of the embodiments of the invention to identify authorized vehicles or groups that are passing through a border region as well as their positions in cases where such a group carries an embodiment of the invention with them.

An embodiment can include designs which are carried or positioned on, e.g., backpacks or stretched over sleds, motorcycles, sailing or other vessels, etc.

An embodiment of the invention can have antenna or resonator structures which have antenna structures or elements which are connected across faces to form, e.g., a dipole, where each face on a PAR on sides which have common center (e.g., on one side, the PAR is formed with five triangular faces with a common apex forming a center which is oriented at an angle greater than 90 degrees from a base of the PAR) that faces in a common direction where each face has an multiple strips of antennas running perpendicular to the common apex facing in the common direction and there are corresponding strips of antennas on each of the faces are formed as a spiral starting at the common center and running to an outer edge of the PAR faces (e.g., the five triangular faces).

Another embodiment of the invention can include a method including a use of an array of the PAR structures which are disposed in a particular pattern which produce a constructively amplified response signal.

Additional embodiments can include a capability or structure to actively change a signal type emitting autonomously from the PAR, e.g., panels layered with a modulator, e.g., a Liquid Crystal Modulator (LCM), for features such as encryption, PAR health status, etc. Having an organic display would also allow an operator to alter a frequency of a signal (e.g. light, RF signal, etc.) incident to the PAR by changing a dialectic constant of a material over a PAR antenna or receiving or reflecting element and thus creating a landing pattern for aircraft. By actively and adaptively altering the panels permeability and permittivity, an operator or designer can ensure that a PAR embodiment is jam resistant' and or aid in preventing undesired or unintentional interference.

Although the invention has been described in detail with reference to certain preferred embodiments, variations and modifications exist within the spirit and scope of the invention as described and defined in the following claims.

The invention claimed is:

1. An identification or messaging system comprising:
   a first structure comprising a plurality of surfaces having different orientations, said surfaces comprising a base structure and two or more additional surfaces positioned at an angle with respect to the base, said two or more additional surfaces comprising a first and second surface;
   a plurality of radio frequency (RF) resonance or reflection antenna panels (RFAP) comprising a first and second said RF resonance or reflection antennas are positioned on said first and second surfaces, wherein at least two of said RFAPs have a different structure from at least one of other said RFAPs and are respectively configured to generate a first and second altered RF signal in response to an initial RF signal; and
   an airborne RF transmitter/receiver (RFTR) platform comprising a transmitter/receiver operable to generate said initial RF signal, a control system, and a library comprising a plurality of RF signatures comprising said first and second altered RF signal and an identification data associated with said first and second altered RF signals.

2. A system as in claim 1, further comprising a plurality of covers wherein at least one said cover is placed over at least one said RFAP.

3. A system as in claim 2, wherein said plurality of covers are configured to block visible light and be transparent to said initial RF signal and said first and second altered RF signals.

4. A system as in claim 2, wherein said plurality of covers are configured to block said initial RF signals.

5. A system as in claim 1, wherein a plurality of RFAPs have a single antenna structure disposed over the plurality of RFAPs such as a spiral antenna formed over a plurality of RFAPs having a common section comprising a plurality of triangular sections having a common apex that forms a point.

6. A system as in claim 1, wherein at least one of said RFAPs further comprises a modulation structure to actively change said altered signal from the at least one of said RFAP panels, wherein modulation structure comprises a Liquid Crystal Modulator (LCM) in a predetermined signal alteration based on a second library storing modulation scheme data coupled with said first structure operable to operate said LCM so that said RFTR detects said modulated altered signal, compares said modulated altered signal with stored data, and associated with said stored RF signals, and determines said identification data.

7. A system as in claim 2, further comprising a secondary signaling system attached to said first structure, wherein said secondary signaling system includes a sensor configured to detect said altered RF signal and activate a beacon, said beacon selected from the group comprising a visual emitter or a non-visual electromagnetic spectrum emitter, said visual emitter comprising a light emitter, a high intensity light, or a flare, said non-visual electromagnetic spectrum emitter comprising an emitter comprising an infra-red (IR) emitter.

8. A system as in claim 1, further comprising a rotation imparting mechanism coupled with said first structure to rotate said first structure based on a plurality of rotational speeds each associated with two or more of a plurality of RF signals comprising said first and second altered signals and said rotational speed each associated with a respective one of said identification data.

9. A system as in claim 1, wherein said plurality of surfaces comprise a first thermal gradient surface and a second thermal gradient surface, wherein said first and second thermal gradient surfaces have a different thermal gradient.

10. A system as in claim 1, further comprising a plurality of edge sections, said plurality of edge sections are disposed around at least one of said plurality of surfaces, wherein said plurality of edge sections have different thermal gradients than said at least one of said plurality of surfaces.

11. A method of using an identification or messaging system comprising:

providing a polygonal asymmetric reflector (PAR) unit with a plurality of different removable/re-attachable reflected RF panels (RRFP) including a number of pairs of identical RRFPs that have antenna element pattern embodiments configured to resonate or reflect one or more first RF signals from one or more airborne RF transmitters formed to generate a particular altered RF signal, wherein the antenna element pattern embodiments comprises conductive materials formed in different patterns selected from a group comprising a RF identification (RFID), an antenna formed to reflect or resonate RF signals, or a plurality of antennas formed as fractal patterns with each fractal element of the pattern associated with a wavelet transform element that is fed by a segmented signal element;

selecting one or more of the plurality of different RRFPs having a said antenna pattern associated with a predetermined message or condition stored in a library comprising an identification of a particular entity or type of entity that is stored in a library associated with an embodiment of the invention, hereinafter selected RRFPs;

positioning and configuring one or more faces or surfaces of said PAR unit with said one or more of the selected RRFPs and orienting said PAR and one or more particular said faces or surfaces with at least one said selected RRFPs with respect to a skyward point or direction of travel of one or more predetermined aerial platforms generating a first RF signals that resonates or reflects altered RF signals from said one or more selected RRFPs and has said library;

providing said aerial platform, positioning said platform with respect to the PAR and selected RRFPs and oriented faces or surfaces, and generating said first RF signals towards said PAR;

operating an RF signal detection system on said aerial platform to detect one or more said altered RF signals from said selected RRFPs;

correlating said predetermined message or condition and identification in said library with said detected altered RF signals; and outputting said identification and predetermined message in response to said correlating result.

12. A method as in claim 11, further comprising disposing a plurality of said PAR units along a navigational path or corridor which collectively generate a plurality of said altered RF signal, wherein said RF signal detection system is further configured to plot and display relative location of said plurality of PAR units in a navigational system or navigational display that is configured to use said plurality of said altered RF signals to provide a display configured for controlling navigation steps, landing steps, or movement or operation of an equipment item associated with said aerial platform.

13. A method as in claim 12, wherein said aerial platform is an aircraft and said navigational, landing, path or corridor are disposed alongside or in relation to an aircraft runway, said path or corridor is used to land said aerial platform.

14. An identification or messaging system comprising:

a first structure comprising a plurality of surfaces having different orientations, said surfaces comprising a base structure and two or more additional surfaces positioned at an angle with respect to the base, said two or more additional surfaces comprising a first and second surface;

a plurality of radio frequency (RF) resonance or reflection antenna panels (RFAP) comprising a first and second said RF resonance or reflection antennas are positioned on said first and second surfaces, wherein at least two of said RFAPs has a different structure from at least one of other said RFAPs and are respectively configured to generate a first and second altered RF signal in response to an initial RF signal;

an airborne RF transmitter/receiver (RFTR) platform comprising a transmitter/receiver operable to generate said initial RF signal, a control system, and a library comprising a plurality of RF signatures comprising said first and second altered RF signal and an identification data associated with said first and second altered RF signals;

a plurality of covers wherein at least one said cover is placed over at least one said RFAP;

a modulation structure to actively change said altered signal from the RFAPs panels layered with a modulator comprising a Liquid Crystal Modulator (LCM) in a predetermined signal alteration based on a second library storing modulation scheme data operable to operate said LCM so that said RFTR detects said modulated altered signal, compares said modulated altered signal with stored data, and associated with said stored RF signals, and determines said identification data;

a secondary signaling system attached to said first structure, wherein said secondary signaling system includes a sensor configured to detect said altered RF signal and activate a beacon, said beacon selected from the group comprising a visual emitter or a non-visual electromagnetic spectrum emitter, said visual emitter comprising a light emitter, a high intensity light, or a flare, said non-visual electromagnetic spectrum emitter comprising an emitter comprising an infra-red (IR) emitter;

a rotation imparting mechanism coupled with said first structure to rotate said first structure based on a plurality of rotational speeds each associated with two or more of a plurality of RF signals comprising said first and second altered signals and said rotational speed each associated with a respective one of said identification data;

a plurality of edge sections, said plurality of edge sections are disposed around at least one of said plurality of surfaces, wherein said plurality of edge sections have a different thermal gradient than said at least one of said plurality of surfaces;

wherein said plurality of surfaces comprise a first thermal gradient surface and a second thermal gradient surface, wherein said first and second thermal gradient surfaces have a different thermal gradients from each other;

wherein said plurality of covers are configured to block visible light and be transparent to said initial RF signal and said first and second altered RF signals;

wherein said plurality of covers are configured to block said initial RF signals; and wherein a plurality of RFAPs have a single antenna structure disposed over the plurality of RFAPs such as a spiral antenna formed over a plurality of RFAPs having a common section comprising a plurality of triangular sections having a common apex that forms a point.

15. A method of using an identification or messaging system comprising:

providing a polygonal asymmetric reflector (PAR) unit with a plurality of different removable/re-attachable reflected RF panels (RRFP) including a number of pairs of identical RRFPs that have antenna element pattern embodiments configured to resonate or reflect one or more first RF signals from one or more airborne RF transmitters formed to generate a particular altered RF signal, wherein the antenna element pattern embodiments comprises conductive materials formed in different patterns selected from a group comprising a RF identification (RFID), an antenna formed to reflect or resonate RF signals, or a plurality of antennas formed as fractal patterns with each fractal element of the pattern associated with a wavelet transform element that is fed by a segmented signal element;

selecting one or more of the plurality of different RRFPs having a said antenna pattern associated with a predetermined message or condition stored in a library comprising an identification of a particular entity or type of entity that is stored in a library associated with an embodiment of the invention, hereinafter selected RRFPs;

disposing a plurality of said PAR units disposed along a navigational path or corridor which collectively generate a plurality of said altered RF signal, wherein said RF signal detection system is further configured to plot relative location of said plurality of PAR units in a navigational system or navigational display that is configured to use said plurality of said altered RF signals to control navigation or an equipment item associated with said aerial platform;

positioning and configuring one or more faces or surfaces of at least one said PAR unit with said one or more of the selected RRFPs and orienting said PAR and one or more particular said faces or surfaces with at least one said selected RRFPs with respect to a skyward point or direction of travel of one or more predetermined aerial platforms generating a first RF signals that resonates or reflects altered RF signals from said one or more selected RRFPs and has said library;

providing said aerial platform, positioning said platform with respect to the PAR and selected RRFPs and oriented faces or surfaces, and generating said first RF signals towards said PAR;

operating an RF signal detection system on said aerial platform to detect one or more said altered RF signals from said selected RRFPs;

correlating said predetermined message or condition and identification in said library with said detected altered RF signals; and outputting said identification and predetermined message in response to said correlating result.

\* \* \* \* \*